United States Patent [19]

Morimoto

[11] Patent Number: 4,961,962
[45] Date of Patent: Oct. 9, 1990

[54] METHOD AND APPARATUS FOR DISPERSING SPACERS OF A LIQUID-CRYSTAL DISPLAY PANEL

[75] Inventor: Mituaki Morimoto, Tenri, Japan

[73] Assignee: Sharp Kabushiki Kaisha, Osaka, Japan

[21] Appl. No.: 250,320

[22] Filed: Sep. 28, 1988

[30] Foreign Application Priority Data

Jan. 21, 1988 [JP] Japan .................................. 63-11614

[51] Int. Cl.$^5$ ............................ B05C 3/02; B05C 5/00
[52] U.S. Cl. ..................................... 427/180; 118/309; 427/185
[58] Field of Search ................ 366/101; 118/309, 308, 118/DIG. 5, 312, 630; 427/197, 185, 195, 180

[56] References Cited

U.S. PATENT DOCUMENTS

| | | | |
|---|---|---|---|
| 633,694 | 9/1899 | Herdst | 118/309 |
| 3,207,618 | 9/1965 | De Hart | 427/182 |
| 3,399,516 | 9/1968 | Hough et al. | 210/496 |
| 3,437,505 | 4/1969 | Narken et al. | 118/309 |
| 3,572,287 | 3/1971 | Saito | 118/308 |
| 3,862,030 | 1/1975 | Goldberg | 210/496 |
| 3,865,079 | 2/1975 | Kellams et al. | 118/DIG. 5 |
| 3,903,838 | 9/1975 | Bennett et al. | 118/308 |
| 4,089,998 | 5/1978 | Gibson | 427/182 |
| 4,170,074 | 10/1979 | Heckman et al. | 118/DIG. 5 |
| 4,182,783 | 1/1980 | Henry | 118/DIG. 5 |
| 4,543,274 | 9/1985 | Mulder | 427/197 |
| 4,662,309 | 5/1987 | Mulder | 118/308 |
| 4,685,419 | 8/1987 | Nakajima | 118/DIG. 5 |
| 4,730,647 | 3/1988 | Mulder | 118/308 |

Primary Examiner—Willard Hoag
Attorney, Agent, or Firm—Irell & Manella

[57] ABSTRACT

An apparatus for dispersing spacers of a liquid-crystal display panel comprises a dispersal box containing a substrate of the liquid-crystal display panel, and at least one spacer feed tank, the dispersal box and the spacer feed tank being connected to each other by means of a feed pipe, wherein the spacers are mixed with a gas as a dispersion medium, supplied from the spacer feed tank to the dispersal box through the feed pipe, and are then dispersed over the substrate.

9 Claims, 2 Drawing Sheets

METHOD AND APPARATUS FOR DISPERSING SPACERS OF A LIQUID-CRYSTAL DISPLAY PANEL

BACKGROUND OF THE INVENTION

1. Field of the invention:

This invention relates to an apparatus for dispersing spacers on the substrate of a liquid-crystal display panel that define the space between the upper and lower substrates of the display panel.

2. Description of the prior art:

The basic structure of liquid-crystal display panels has, as shown in FIG. 4, two substrates 31 and 32 spaced at a fixed distance from each other, which form a space into which liquid crystals 33 are sealed. The size of this space is usually referred to as the "cell thickness".

To obtain a liquid-crystal display panel that has satisfactory display qualities, it is necessary that the cell thickness be uniform within the display field. To make uniform the cell thickness of the liquid-crystal display panel, a method is widely used in which fine spacers 35 are dispersed so as to be incorporated into the space between the two substrates 31 and 32. As these spacers, glass fibers, spherical beads made of plastic, spherical beads of an inorganic material, and the like can be used. The conventional methods for dispersing these spacers over the substrate includes:

(1) a spraying method in which the spacers are suspended in a volatile solvent, and the resulting suspension is sprayed over the substrate; and (2) a dipping method in which the spacers are suspended in a solvent, and the substrate is immersed in the suspension and pulled out of the suspension.

Of these methods, the first method, in which a volatile solvent is used, often involves the use of freon solvents, petroleum solvents, or the like. It is difficult for these solvents to evaporate completely when dispersed together with spacers over liquid-crystal display panels. Thus, the residual components and impurities in the organic solvent may give rise to a poor display, which introduces a problem in the quality of the finished product.

Also, in the second method, spacers are dispersed in an organic solvent, a liquid-crystal aligning agent such as polyimide, or the like, and the substrate is immersed in the mixture, then being pulled slowly out of the mixture so that the spacers will adhere to the substrate. However, when this method is used, there are problems in that the spacers are not uniformly dispersed on the surface of the solvent, that the adhesion of the spacers is affected by fluctuations in the surface tension caused by changes in the state of the substrate surface, and the like. Thus, it is difficult to disperse the spacers uniformly over the entire surface of the substrate.

SUMMARY OF THE INVENTION

The apparatus for dispersing spacers of a liquid-crystal display panel of this invention, which overcomes the above-discussed and numerous other disadvantages advantages and deficiencies of the prior art, comprises a dispersal box containing a substrate of the liquid-crystal display panel, and at least one spacer feed tank, the dispersal box and the spacer feed tank being connected to each other by means of a feed pipe, wherein the spacers are mixed with a gas as a dispersion medium, supplied from the spacer feed tank to the dispersal box through the feed pipe, and are then dispersed over the substrate.

In a preferred embodiment, the spacer feed tank is provided with a porous filter, through which the gas can pass, but through which the spacers cannot pass, and the spacers supported on top of the porous filter are blown upward by the gas passed through the porous filter so as to be mixed with the gas.

In a preferred embodiment, the gas used as the dispersion medium is nitrogen gas.

In a preferred embodiment, the gas used as the dispersion medium is nitrogen gas.

In a preferred embodiment, the porous filter is made of polyvinylchloride.

In a preferred embodiment, the porous filter has a thickness of about 5 to about 10 mm and a pore size of about 10 μm or less.

Thus, the invention described herein makes possible the objectives of (1) providing an apparatus for dispersing spacers of a liquid-crystal display panel by which uniform dispersion of spacers over the entire surface of the substrate of the liquid-crystal display panel can be obtained by the use of a gas as a dispersion medium for the spacers, and by the control of the flow of this gas; (2) providing an apparatus for dispersing spacers of a liquid-crystal display panel that can be operated safely because nitrogen gas is used instead of an organic solvent as the dispersion medium for the spacers; and/or (3) providing an apparatus for dispersing spacers of a liquid-crystal display panel with which it is possible to obtain an extremely uniform cell thickness in the liquid-crystal display panel.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
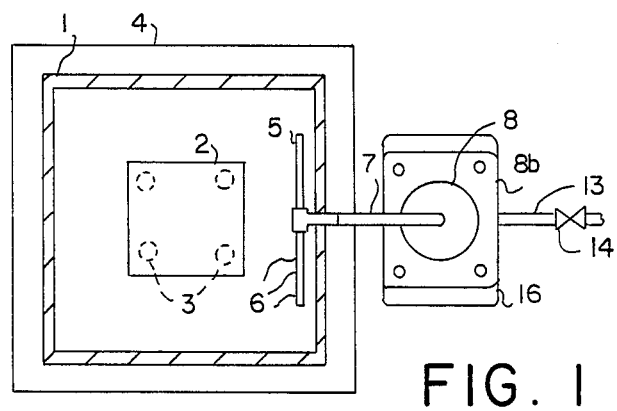
FIG. 1 is a horizontal sectional view of one example of the spacer dispersal apparatus of this invention.

FIG. 1 is a horizontal sectional view of one example of the spacer dispersal apparatus of this invention. Inside the dispersal box 1, there is a substrate 2 on which spacers are to be dispersed, with the surface to be treated facing up, the substrate 2 being placed on top of four thin supporting rods 3. References numeral 4 is a stand to support the dispersal box 1. The dispersal nozzle pipe 5 is provided with a plurality of dispersal nozzles 6, and is connected to the spacer feed tank 8 by means of a feed pipe 7.

Figure 2:
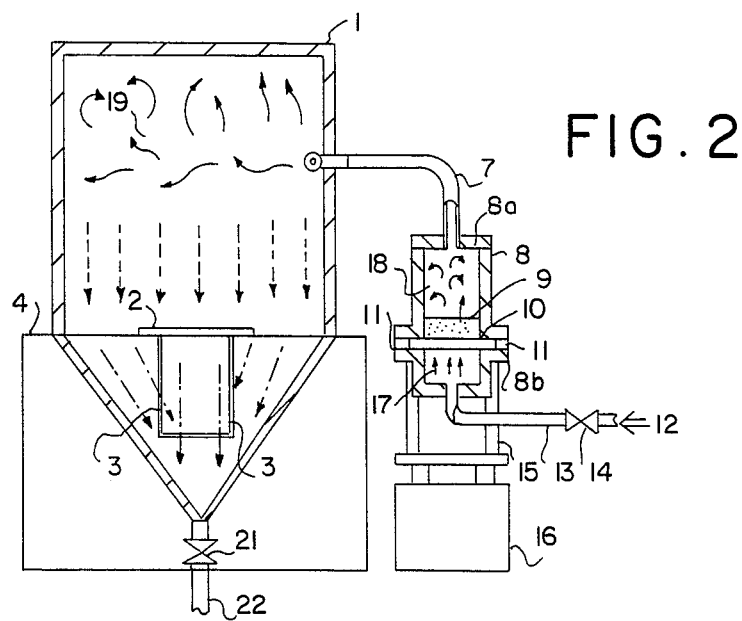
FIG. 2 is a vertical sectional view of the spacer dispersal apparatus shown in FIG. 1.

FIG. 2 is a vertical sectional view of this spacer dispersal apparatus. In the spacer feed tank 8, there are spacers 9, which are supported on top of the porous plastic filter 10 made of polyvinylchloride; this plastic filter is supported by the lower lid 8b of the spacer feed tank 8. To keep the spacer feed tank 8 air-tight, there is provided an outer ring 11 made of rubber. The plastic filter 10 has a thickness of about 5 to about 10 mm and a pore size of about 10 μm or less, so that gas can readily pass through the plastic filter. The upper lid 8a of the spacer feed tank 8 is removed, and the spacers 9 are placed in the spacer feed tank 8. The material from which spacers 9 is made differs depending on the kind of liquid-crystal display panel, but in this example, these plastic spacers are true-spherical powders with the diameter of about 4 to about 5 μm (specific gravity, about 1.19, and dielectric constant, about 2.9), which are made from copolymer containing divinylbenzene as a major component. The diameter of the spacers is smaller than the pore size of the filter 10, but because the pores of filter 10 follow a twisted path, the spacers 9 do not fall through the filter 10.

By the opening for a few seconds of the valve 14 that is provided on the feed pipe 13 to the lower lid 8b, dry nitrogen gas 12 can be introduced at a controlled pressure (0.1 to 0.8 atmosphere) as a dispersion medium into the spacer feed tank 8. The gas that is introduced is denoted by the arrows 17. This introduced nitrogen gas 17 passes through the plastic filter 10, and blows the spacers 9 upward in the spacer feed tank 8. The gas mixture 18 that fills the inside of the spacer feed tank 8 passes through the feed pipe 7 of the upper lid 8a, the dispersal nozzle pipe 5, and the dispersal nozzle 6, to be sprayed inside the dispersal box 1. The sprayed gas mixture 18 sets up a turbulent flow 19, and the spacers 9 float in the dispersal box 1.

After valve 14 is closed, the spacers 9 are left for a certain time (about 0.3 to about 10 minutes), during which time the turbulent flow 19 subsides, and the plastic spacers 9 settle in the direction shown by the dotted arrows in FIG. 2, so as to be dispersed evenly on top of the substrate 2.

If the outlet valve 21 in the bottom of the dispersal box 1 is opened, the gas inside the dispersal box 1 and the spacers attached to the inner walls of the dispersal box 1 are removed via a suction pipe 22. The spacer feed tank 8 is connected to a vibrator 16 by means of a connecting rod 15. By the vibration of this vibrator 16, the gas-escape holes that have formed in the layer of spacers within the spacer feed tank 8 are broken, and the mixing of the spacers 9 and the nitrogen gas 17 is facilitated, so the amount of spacers 9 to be dispersed is kept uniform.

The amount of spacers 9 that is consumed in one use for dispersion is about 0.01 cc. The spacers 9 are made of an insulating material, so the friction with the dry nitrogen gas may give rise to static electricity on the surfaces of the spacer particles, but there is no agglomeration of the spacer particles. To disperse the spacers 9, it is also possible to use a procedure in which spacers 9 are electrostatically neutralized or to use a procedure in which ions are attached to spacers 9.

Figure 3:
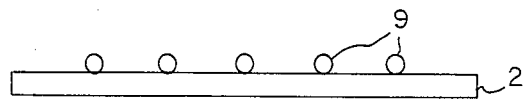
FIG. 3 is a sectional view showing the dispersion of spacers over the substrate.
Figure 4:
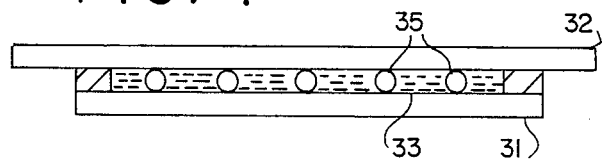
FIG. 4 is a sectional view showing a general structure of liquid-crystal display panels.

FIG. 3 is a sectional view of the substrate obtained in this way. The spacers 9 are dispersed evenly on top of the substrate 2. If the substrate is observed while being illuminated with light from the bottom, the entire substrate looks uniformly white, which shows that the distribution of the spacers is uniform.

In the above example, spherical beads made of an organic material were used as the spacers, but it is also possible to use spherical beads made of an inorganic material or cylindrical glass fibers.

In addition to the construction of this example, it is also possible to have the spacer feed tank, the vibrator, and the connecting rod made as a single spacer feed unit; a single dispersal box can be connected to two or more of such spacer feed units. Also, the substrate supporting rod can be provided with a positioning means and a conveyance means; the dispersal box can be provided with an automatic means for the removal of the spacers and the gas mixture from the inside of the dispersal box; it is thereby possible readily to construct an automated apparatus for continuously dispersing spacers of a liquid-crystal display panel.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An apparatus for dispersing spacers of a liquid-crystal display panel, comprising a dispersal box for containing a substrate of said liquid-crystal display panel, means for positioning said substrate horizontally therein, and at least one spacer feed tank suitable for containing said spacers and for mixing said spacers with a gas dispersion medium, said dispersal box and said spacer feed tank being connected to each other by means of a feed pipe through which said spacers are supplied from said spacer feed tank to said dispersal box, wherein said dispersal box comprises means for intermittantly spraying a fixed amount of a mixture of said spacers and said gas supplied from said spacer feed tank in the horizontal direction so that the mixture covers the entire region above said substrate in turbulent flow and wherein said spacer feed tank has a porous filter for retaining said spacers, through which said gas can pass so that said spacers supported on top of said pourous filter are flown upward and mixed therewith.

2. An apparatus for dispersing spacers of a liquid-crystal display panel according to claim 1, wherein said porous filter is made of polyvinylchloride.

3. An apparatus for dispersing spacers of a liquid-crystal display panel according to claim 1, wherein said porous filter has a thickness of about 5 to 10 mm and a pore size of about 10 mm or less.

4. An apparatus for dispersing spacers of a liquid-crystal display panel according to claim 1, further comprising means for vibrating said spacer feed tank.

5. A method for dispersing spacers over a substrate of a liquid-crystal display panel, comprising
disposing said substrate horizontally in a dispersal box,
blowing said spacers into the dispersal box by means of a gas under controlled pressure and
intermittantly spraying a fixed amount of a mixture of the spacers and said gas, supplied from said spacer feed tank, in the horizontal direction so that the mixture covers the entire region above said substrate in turbulent flow, and
allowing said turbulent flow to subside over a period of time so that said spacers settle and are dispersed evenly on said substrate.

6. A method according to claim 5, wherein said spacers are blown into said dispersal box from a spacer feed tank.

7. A method according to claim 6, wherein said gas is blown through a filter in said spacer feed tank, said spacers being initially disposed between said filter and said spacer feed tank.

8. A method according to claim 9, wherein said spacer feed tank is vibrated.

9. The method of claim 5, wherein said gas is nitrogen.

* * * * *